US007952799B2

(12) United States Patent
Bentley et al.

(10) Patent No.: US 7,952,799 B2
(45) Date of Patent: May 31, 2011

(54) EXTREME BROADBAND COMPACT OPTICAL SYSTEM WITH MULTIPLE FIELDS OF VIEW

(75) Inventors: Julie L Bentley, Penfield, NY (US); Joseph Marshall Kunick, Victor, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/550,962

(22) Filed: Aug. 31, 2009

(65) Prior Publication Data

US 2010/0321808 A1    Dec. 23, 2010

Related U.S. Application Data

(60) Provisional application No. 61/218,577, filed on Jun. 19, 2009.

(51) Int. Cl.
*G02B 23/00* (2006.01)
(52) U.S. Cl. .......................... 359/432; 359/366
(58) Field of Classification Search .................. 359/351, 359/353, 364–366, 419–421, 857–859
See application file for complete search history.

(56) References Cited

U.S. PATENT DOCUMENTS

| | | | |
|---|---|---|---|
| 3,674,334 A | 7/1972 | Offner | |
| 4,265,510 A | 5/1981 | Cook | 350/55 |
| 5,009,494 A | 4/1991 | Iossi et al. | 350/620 |
| 5,144,476 A | 9/1992 | Kebo | |
| 5,206,499 A | 4/1993 | Mantravadi et al. | 250/203.6 |
| 5,227,923 A | 7/1993 | Kebo | 359/859 |
| 5,309,276 A * | 5/1994 | Rodgers | 359/366 |
| 5,363,235 A | 11/1994 | Kiunke et al. | 359/365 |
| 5,471,346 A * | 11/1995 | Ames | 359/731 |
| 5,831,762 A | 11/1998 | Baker et al. | 359/353 |
| 5,936,771 A * | 8/1999 | Cooper | 359/618 |
| 5,969,860 A * | 10/1999 | Mearns | 359/432 |
| 6,020,994 A | 2/2000 | Cook | 359/365 |
| 6,084,727 A | 7/2000 | Cook | |
| 6,118,583 A * | 9/2000 | Rogers | 359/432 |
| 6,741,341 B2 * | 5/2004 | DeFlumere | 356/141.1 |
| 6,970,286 B1 | 11/2005 | Kunick | 359/366 |
| 7,088,427 B2 | 8/2006 | Smith et al. | 355/69 |
| 7,099,077 B2 | 8/2006 | Cook | |
| 2002/0005469 A1 | 1/2002 | Marzouk et al. | 250/203.4 |
| 2005/0231705 A1 | 10/2005 | Smith et al. | 355/69 |
| 2005/0237512 A1 | 10/2005 | Smith et al. | 356/124 |

* cited by examiner

*Primary Examiner* — Mark Consilvio
(74) *Attorney, Agent, or Firm* — Timothy M. Schaeberle

(57) ABSTRACT

An optical system is described herein which has a compact, all reflective design that has multiple fields of view for imaging an object. The optical system also has identical viewing directions and can have several different configurations for adding laser range finding and designating components.

5 Claims, 11 Drawing Sheets

EXTREME BROADBAND COMPACT OPTICAL SYSTEM WITH MULTIPLE FIELDS OF VIEW

CLAIMING BENEFIT OF PRIOR FILED U.S. APPLICATION

This application claims the benefit of U.S. Provisional Application Ser. No. 61/218,577 entitled "Extreme Broadband Compact Optical System with Multiple Fields of View" filed on Jun. 19, 2009 the contents of which are hereby incorporated by reference herein.

TECHNICAL FIELD

The present invention relates to an optical system which has a compact, all reflective design that has multiple fields of view for imaging an object. The optical system also has identical viewing directions and can have several different configurations for adding laser range finding and designating components.

BACKGROUND

Progress in imaging detectors has opened up a new optical design space. Recent developments include combining functions (daytime/nighttime/all weather imaging) that were previously only available with separate imaging detectors. For example, a single imaging detector is now able to image from 0.9 um to 5 um or 3 um to 12 um. Previously these wavelength bands were broken up into two separate smaller wavebands (short-wavelength infrared (SWIR) and mid-wavelength infrared (MWIR) or MWIR and long-wavelength infrared (LWIR)) which required the use of two separate imaging detectors. In these smaller wavelength ranges, refractive optical systems for each separate waveband are typically preferred. However, as the imaging detector's bandwidth increases and therefore the optical system's bandwidth increases there are limited refractive optical materials available that can transmit over this increased spectral range. Furthermore, the materials that do exist make it difficult to provide color correction. For example, crowns switch to flints and flints switch to crowns when moving from the SWIR to the MWIR. This makes it challenging to design a compact lightweight refractive optical system for the entire waveband that can be used with the new imaging detectors. Plus, additional features such as multiple imaging field of views, handheld operation, and 100% cold shielding make it even more difficult to design a refractive optical system that meets all specifications over the increased spectral bandwidth requirements. Thus, there is a need for an optical system that addresses the shortcomings associated with the traditional refractive optical system. This need and other needs are satisfied by the optical system and method of the present invention.

SUMMARY

In one aspect, the present invention provides an optical system (all-reflective telescope) adapted to operate in either a narrow field of view mode or a wide field of view mode to image an object. The optical system includes: (a) a first (large) entrance aperture; (b) a second (small) entrance aperture; (c) a reflective beam expander; (d) a reflective imager; (e) a moveable field of view changing mirror; and (f) an imaging detector. In the narrow field of view mode: (i) the moveable field of view changing fold mirror is located out of the optical beam path; (ii) the reflective imager receives a first optical beam that passed through the first entrance aperture; and (iii) the imaging device receives the first optical beam that passed through the reflective imager and images the object. In the wide field of view mode: (i) the reflective beam expander receives a second optical beam that passed through the second entrance aperture; (ii) the moveable field of view changing fold mirror is located in the optical beam path and receives and reflects the second optical beam that passed through the reflective beam expander; (iii) the reflective imager receives the second optical beam reflected from the moveable field of view changing fold mirror; and (iv) the imaging detector receives the second optical beam that passed through the reflective imager and images the object. If desired, the optical system can have several different configurations for adding laser range finding and designating components.

In another aspect, the present invention provides a method for imaging an object. The method includes the steps of: (a) providing an optical system (all-reflective telescope) that includes a first (large) entrance aperture, a second (small) entrance aperture, a reflective beam expander, a reflective imager, a moveable field of view changing mirror, and an imaging detector; (b) operating the optical system in a narrow field of view mode to image the object wherein: (i) the moveable field of view changing fold mirror is located out of an optical beam path; (ii) the reflective imager receives a first optical beam that passed through the first entrance aperture; and (iii) the imaging device receives the first optical beam that passed through the reflective imager and images the object; and (c) operating the optical system in a wide field of view mode to image the object wherein: (i) the reflective beam expander receives a second optical beam that passed through the second entrance aperture; (ii) the moveable field of view changing fold mirror is located in the optical beam path and receives and reflects the second optical beam that passed through the reflective beam expander; (iii) the reflective imager receives the second optical beam reflected from the moveable field of view changing fold mirror; and (iv) the imaging detector receives the second optical beam that passed through the reflective imager and images the object. If desired, the optical system can have several different configurations for adding laser range finding and designating components.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1A:
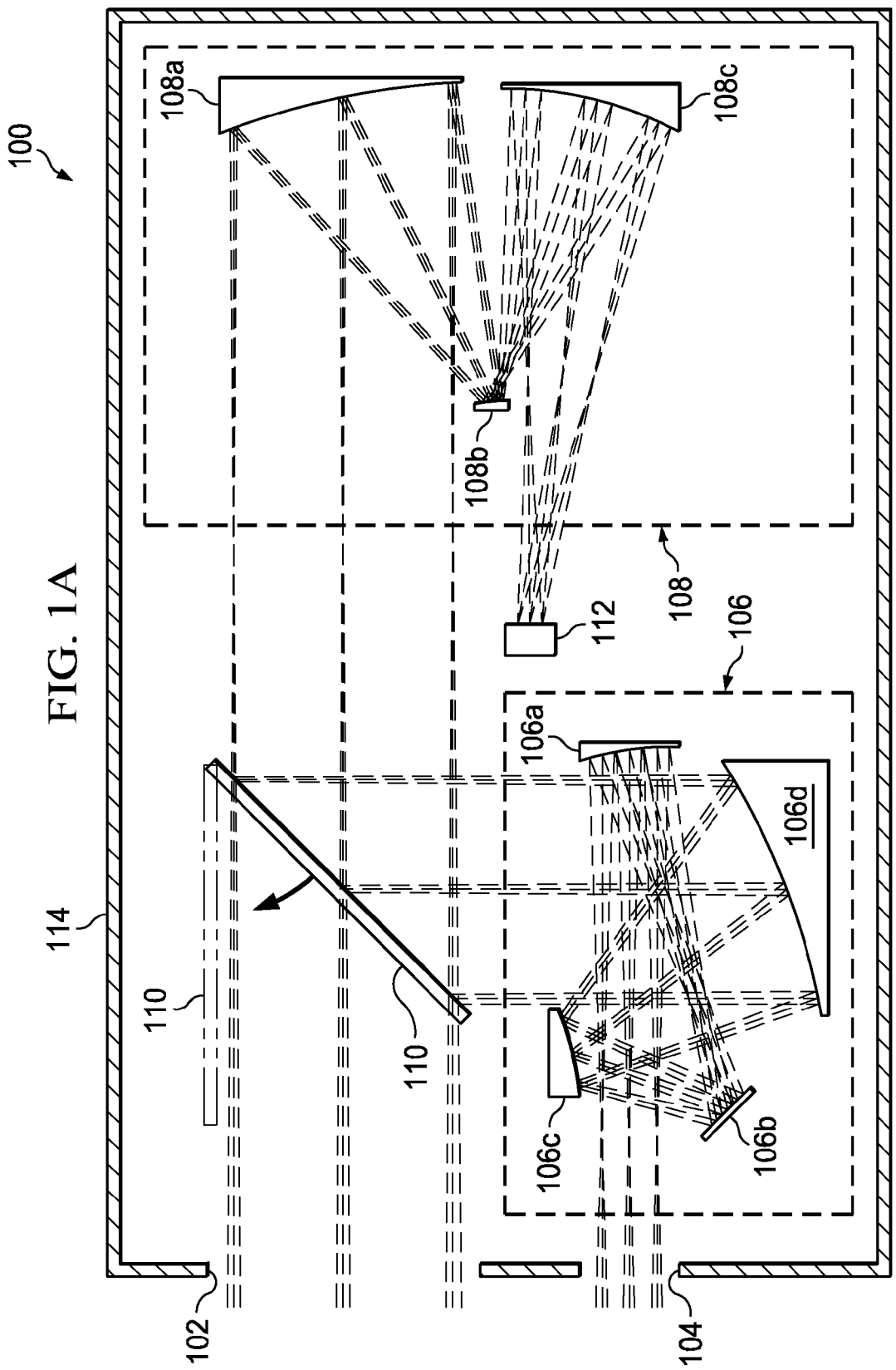
FIGS. 1A-1C are diagrams illustrating the basic components of an optical system in accordance with a first embodiment of the present invention.
Figure 1B:
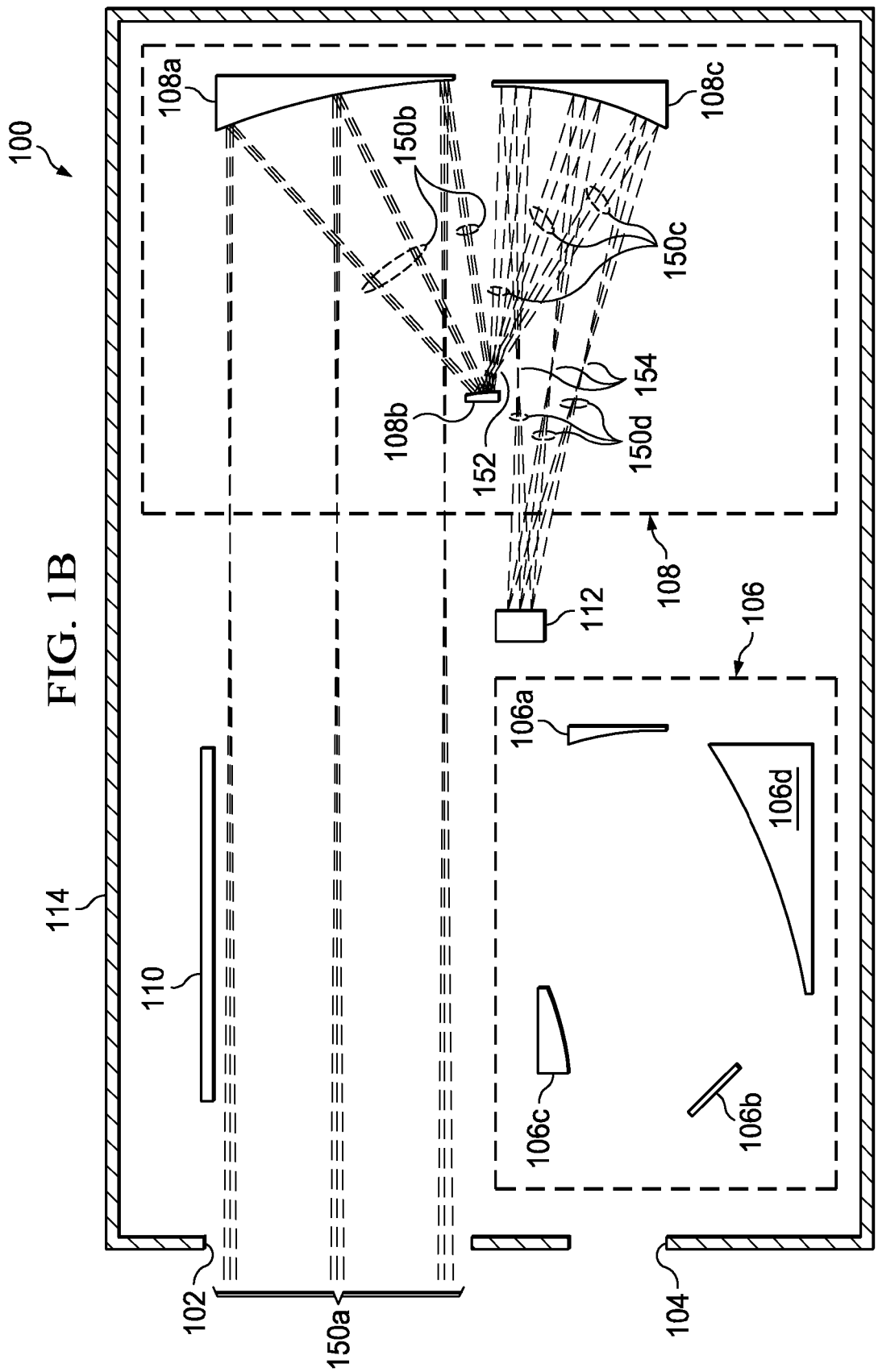
Figure 1C:
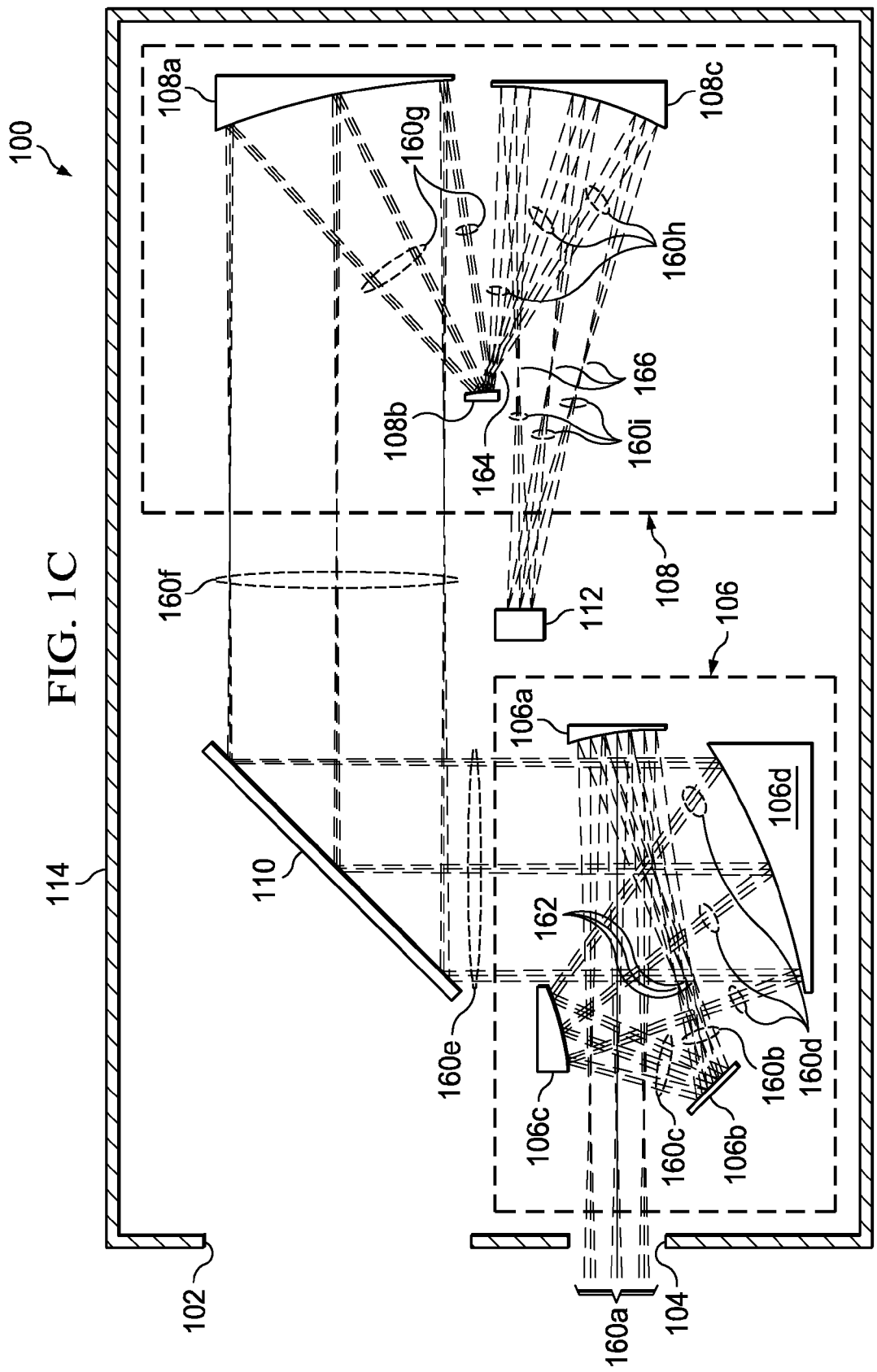

Referring to FIGS. 1A-1C, there is illustrated an optical system 100 (reflective telescope 100) in accordance with a first embodiment of the present invention. In FIG. 1A, the optical system 100 includes a first (large) entrance aperture 102, a second (small) entrance aperture 104, a reflective beam expander 106 (e.g., enhanced afocal three mirror anastigmat 106), a reflective imager 108 (e.g., focal three mirror anastigmat 108), a moveable field of view changing mirror 110, and an imaging detector 112. If desired, the optical system 100 can be packaged within an electro-optical gimbal assembly 114.

The optical system 100 is adapted to operate in either a narrow field of view (NFOV) mode (e.g., 1°-4°) or a wide field of view (WFOV) mode (e.g., 4°-20°) to image an object (not shown). For instance, when the moveable field of view changing mirror 110 is located out of the beam path (see dashed lines), the focal three mirror anastigmat 108 images a narrow field of view of the object through the large entrance aperture 102 onto the imaging detector 112 (see FIG. 1B). When the moveable field of view changing mirror 110 is flipped into place between the afocal three mirror anastigmat 106 and the focal three mirror anastigmat 108, a wider field of view of the object through the smaller entrance aperture 104 is imaged onto the same imaging detector 112 (see FIG. 1C). The ratio of the field of view between the narrow field of view and the wide field of view is dependent on the afocal magnification of the afocal three mirror anastigmat 106. The special compact folded configuration of the afocal three mirror anastigmat 106 allows both fields of view to "look" in the same direction towards the object.

In FIG. 1B, the optical system 100 is shown configured in the NFOV mode during which the moveable field of view changing mirror 110 is located out of the beam path so the narrow field of view of the object is imaged onto the imaging detector 112. In this configuration, the optical system 100 is shown receiving an incident beam 150a (optical beam 150a) from the object (not shown) which passed through the first (large) entrance aperture 102. The beam 150a is reflected by a primary mirror 108a (e.g., primary aspheric concave mirror 108a) which causes the beam 150a to converge to beam 150b. Beam 150b is incident on a secondary mirror 108b (e.g., secondary aspheric convex mirror 108b) which reflects a convergent beam 150c that forms intermediate image 152 and then beam 150c diverges and is incident on a tertiary mirror 108c (e.g., tertiary aspheric mirror 108c). The tertiary mirror 108c receives the divergent beam 150c and reflects a convergent beam 150d that forms an accessible exit pupil 154. From the exit pupil 154, the beam 150d converges and is incident on the imaging detector 112. The imaging detector 112 analyzes beam 150d and provides a narrow field of view image of the object. FIG. 1B for clarity did not show an incident beam 160a (optical beam 160a) which is associated with the wide field of view of the object (discussed next).

In FIG. 1C, the optical system 100 is shown configured in the WFOV mode during which the moveable field of view changing mirror 110 is located between the afocal three mirror anastigmat 106 and the focal three mirror anastigmat 108 so the wide field of view of the object is imaged onto the imaging detector 112. In this configuration, the optical system 100 is shown receiving an incident beam 160a (optical beam 160a) from the object (not shown) which passed through the second (small) entrance aperture 104. Beam 160a is incident on a tertiary mirror 106a (e.g., tertiary aspheric mirror 106a) which reflects a convergent beam 160b that forms an intermediate image 162 and then diverges and is incident on a fold mirror 106b (may be an aspheric fold mirror 106b to obtain a wider field of view). The intermediate image 162 could be located on either side of fold mirror 106b. The fold mirror 106b reflects a divergent beam 160c that is incident on a secondary mirror 106c (e.g., secondary aspheric mirror 106c) which reflects a divergent beam 160d. Beam 160d is incident on a primary mirror 106d (e.g., primary aspheric mirror 106d) which reflects a collimated beam 160e towards the moveable field of view changing mirror 110. The moveable field of view changing mirror 110 reflects a beam 160f which is incident on the primary mirror 108a. The primary mirror 108a reflects beam 160f to form a convergent beam 160g. Beam 160g is incident on the secondary mirror 108b which reflects a convergent beam 160h that forms intermediate image 164 and then beam 160h diverges and is incident on the tertiary mirror 108c. The tertiary mirror 108c receives the divergent bean 160h and reflects a convergent beam 160i that forms an accessible exit pupil 166. From the exit pupil 166, the beam 160i converges and is incident on the imaging detector 112. The imaging detector 112 analyzes beam 160i and provides a wide field of view image of the object. FIG. 1C for clarity did not show an incident beam 150a (optical beam 150a) which is associated with the narrow field of view of the object.

The prescription data for an exemplary optical system 100 is provided below with respect to TABLES 1-6. TABLES 1-3 present surface prescription data for an exemplary afocal three mirror anastigmat 106 which has a 4× magnification, 12.5 mm entrance pupil diameter and a 4°×4° field of view. In TABLE 1, all dimensions are given in millimeters.

TABLE 1

| ELEMENT NUMBER | RADIUS OF CURVATURE | | THICKNESS | GLASS |
|---|---|---|---|---|
| | FRONT | BACK | | |
| OBJECT | | INF | INFINITY | |
| 1 | | A(1) | −84.6651 | REFL |
| | DECENTER(1) | | | |
| 2 | | INF | 24.2741 | REFL |
| 3 | | A(2) | −51.4141 | REFL |
| 4 | | A(3) | 100.0000 | REFL |
| | DECENTER(2) | | | |
| IMAGE | | INF | APERTURE STOP | |

In TABLE 1, element numbers 1-4 respectively correspond with the tertiary mirror 106a, the fold mirror 106b, the secondary mirror 106c and the primary mirror 106d. The "decenter" (D(j)) defines a new coordinate system (displaced and/or rotated) which is used to define surfaces of the optical system 100. The thickness indicates the axial distance to the next surface. The A(i) indicates the aspheric mirror i defined by the following equation and TABLE 2:

$$Z = \frac{(CURV)Y^2}{1 + \left(1 - (1+K)(CURV)^2 Y^2\right)^{\frac{1}{2}}}$$

TABLE 2

| ASPHERIC | CURV | K |
|---|---|---|
| A(1) | −0.00925926 | −1.000000 |
| A(2) | 0.01941290 | −3.759012 |
| A(3) | 0.00725096 | −1.000000 |

In TABLE 3, the decenter system data are given where tilt configurations are defined by angles alpha, beta, and gamma (degrees) so as to follow standard cartesian coordinate system nomenclature. The trailing code BEND means tilting the coordinate system following the reflection by an amount equal to the tilt of the surface that is in question.

TABLE 3

| DECENTER | X | Y | Z | ALPHA | BETA | GAMMA |
|---|---|---|---|---|---|---|
| D(1) | 0.0000 | 0.0000 | 0.0000 | 45.0000 | 0.0000 | 0.0000 (BEND) |
| D(2) | 0.0000 | −53.0000 | 0.0000 | 0.0000 | 0.0000 | 0.0000 |

TABLES 4-6 present surface prescription data for an exemplary focal three mirror anastigmat 108 which has a 200 mm effective focal length (EFL), F/4 and a 1°×1° field of view. In TABLE 4, all dimensions are given in millimeters.

TABLE 4

| ELEMENT NUMBER | RADIUS OF CURVATURE | | THICKNESS | GLASS |
|---|---|---|---|---|
| | FRONT | BACK | | |
| OBJECT | INF | | INFINITY | |
| | | | APERTURE STOP | |
| | | | 100.0000 | |
| | | | DECENTER(1) | |
| 1 | A(1) | | −73.6539 | REFL |
| 2 | A(2) | | 72.0472 | REFL |
| 3 | A(3) | | −123.9959 | REFL |
| IMAGE | INF | | | |
| | | | DECENTER(2) | |

In TABLE 4, element numbers 1-3 respectively correspond with the primary mirror 108a, the secondary mirror 108b and the tertiary mirror 108c. The "decenter" (D(j)) defines a new coordinate system (displaced and/or rotated) which is used to define surfaces of the optical system 100. The thickness indicates the axial distance to the next surface. The A(i) indicates the aspheric mirror i defined by the following equation and TABLE 5:

$$Z = \frac{(CURV)Y^2}{1 + \left(1 - (1+K)(CURV)^2 Y^2\right)^{\frac{1}{2}}}$$

TABLE 5

| ASPHERIC | CURV | K |
|---|---|---|
| A(1) | −0.00640397 | −1.000000 |
| A(2) | −0.03002987 | −56.529680 |
| A(3) | −0.01159856 | −0.103782 |

In TABLE 6, the decenter system data are given where tilt configurations are defined by angles alpha, beta, and gamma (degrees) so as to follow standard cartesian coordinate system nomenclature. The trailing code RETU means return to the coordinate system preceding the decentration.

TABLE 6

| DECENTER | X | Y | Z | ALPHA | BETA | GAMMA |
|---|---|---|---|---|---|---|
| D(1) | 0.0000 | −33.6380 | 0.0000 | 0.0000 | 0.0000 | 0.0000 |
| D(2) | 0.0000 | −0.0272 | 0.0000 | −5.1093 | 0.0000 | 0.0000 (RETU) |

Figure 2A:
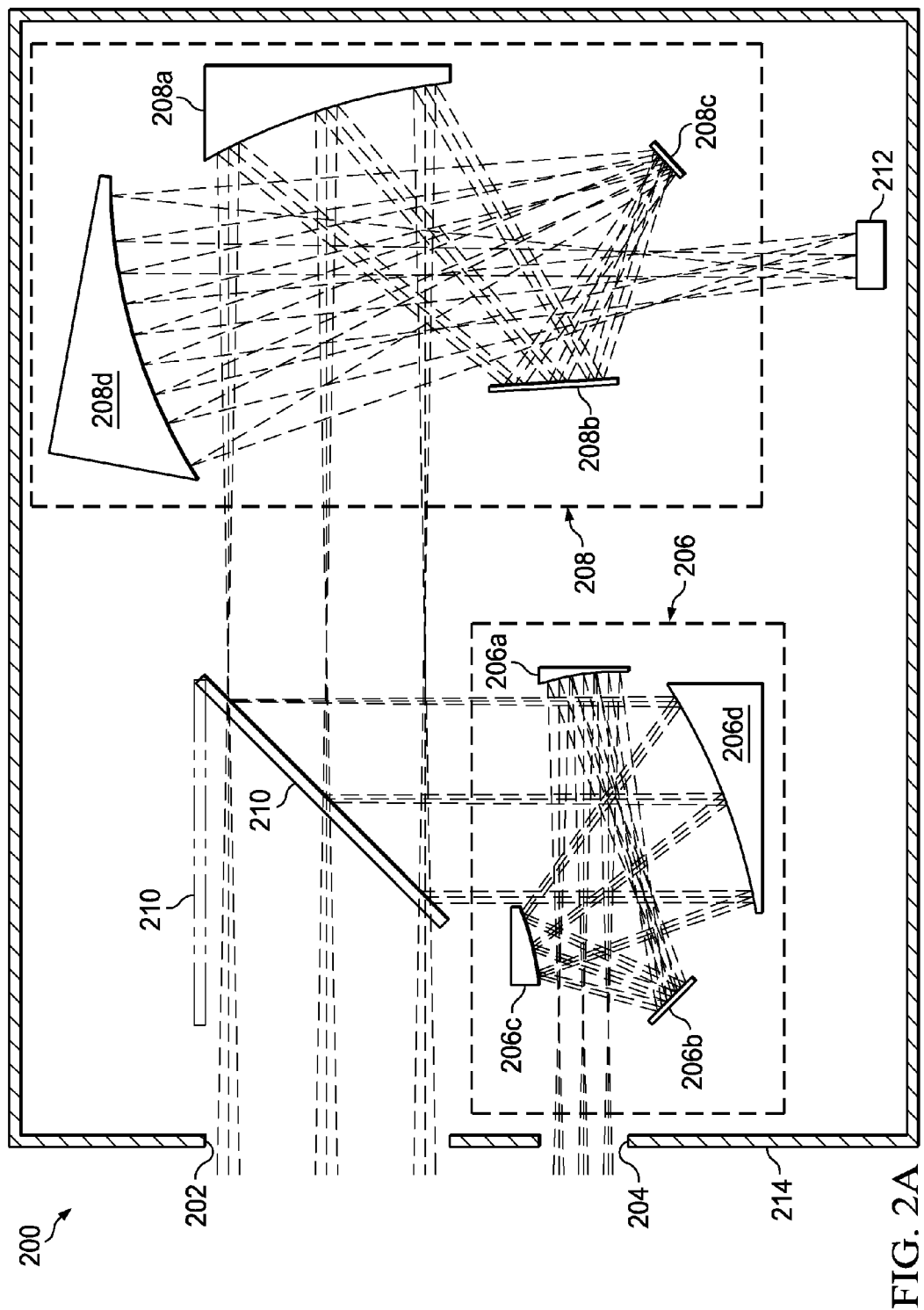
FIGS. 2A-2C are diagrams illustrating the basic components of an optical system in accordance with a second embodiment of the present invention.
Figure 2B:
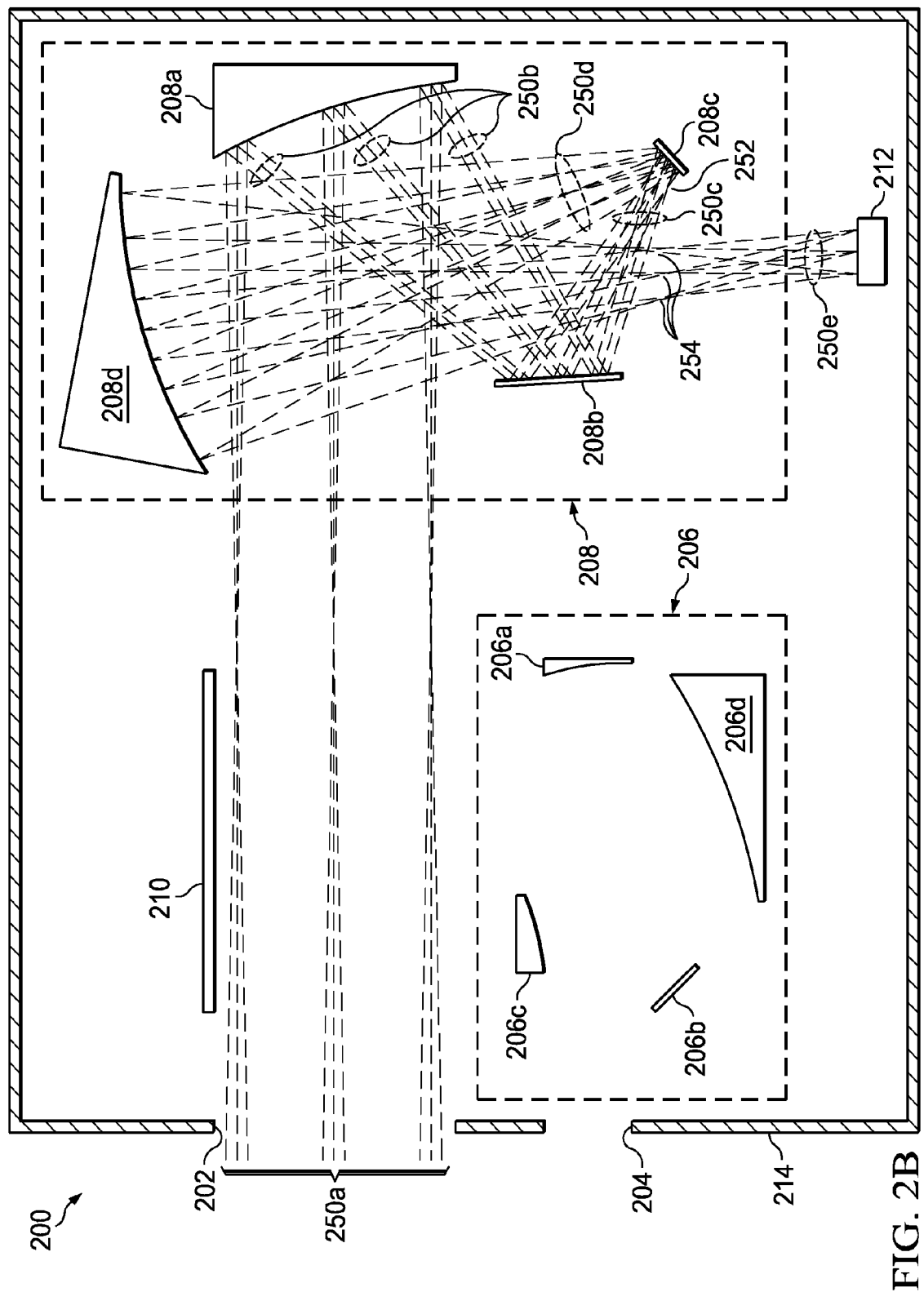
Figure 2C:
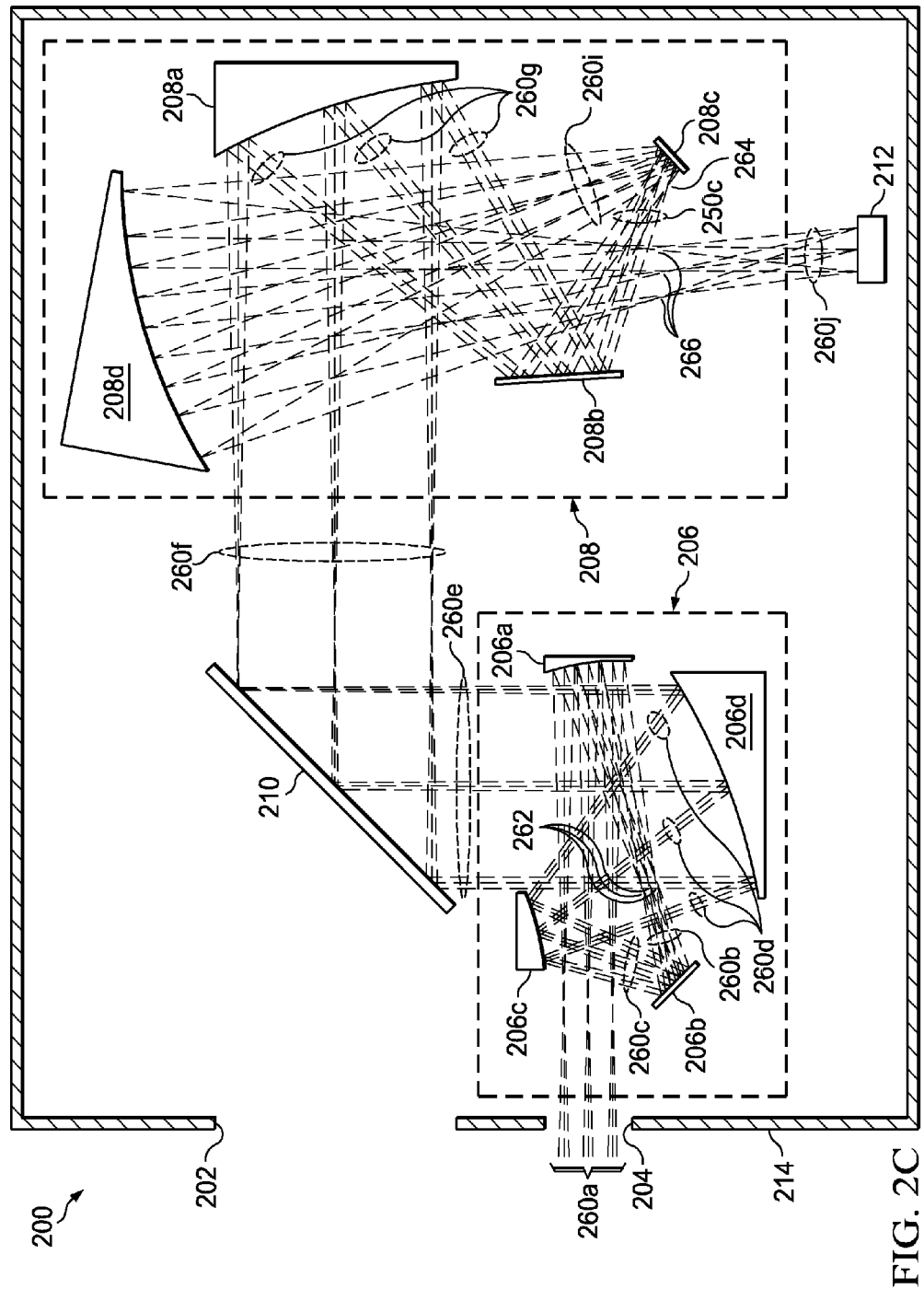

Referring to FIGS. 2A-2C, there are illustrated an optical system 200 (reflective telescope 200) in accordance with a second embodiment of the present invention. In FIG. 2A, the optical system 200 includes a first (large) entrance aperture 202, a second (small) entrance aperture 204, a reflective beam expander 206 (e.g., enhanced afocal three mirror anastigmat 206), a reflective imager 208 (e.g., enhanced focal three mirror anastigmat 208), a moveable field of view changing mirror 210, and an imaging detector 212. If desired, the optical system 200 can be packaged within an electro-optical gimbal assembly 214.

The optical system 200 is adapted to operate in either a narrow field of view (NFOV) mode (e.g., 1°-4°) or a wide field of view (WFOV) mode (e.g., 4°-20°) to image an object (not shown). For instance, when the moveable field of view changing mirror 210 is located out of the beam path (see dashed lines), the focal three mirror anastigmat 208 images a narrow field of view of the object through the large entrance aperture 202 onto the imaging detector 212 (see FIG. 2B). When the moveable field of view changing mirror 210 is flipped into place between the afocal three mirror anastigmat 206 and the focal three mirror anastigmat 208, a wider field of view of the object through the smaller entrance aperture 204 is imaged onto the same imaging detector 212 (see FIG. 2C). The ratio of the field of view between the narrow field of view and the wide field of view is dependent on the afocal magnification of the afocal three mirror anastigmat 206. The special compact folded configuration of the afocal three mirror anastigmat 206 allows both fields of view to "look" in the same direction towards the object.

In FIG. 2B, the optical system 200 is shown configured to be in a NFOV mode during which the moveable field of view changing mirror 210 is located out of the beam path so the narrow field of view of the object is imaged onto the imaging detector 212. In this configuration, the optical system 200 is shown receiving an incident beam 250a (optical beam 250a) from the object (not shown) which passed through the first (large) entrance aperture 202. The beam 250a is reflected by a primary mirror 208a (e.g., primary aspheric concave mirror 208a) which causes the beam 250a to converge to beam 250b. Beam 250b is incident on a secondary mirror 208b (e.g., secondary aspheric convex mirror 208b) which reflects a convergent beam 250c that forms an intermediate image 252 and then beam 250c diverges and is incident on a fold mirror 208c (may be an aspheric fold mirror 208c to obtain a wider field of view). The fold mirror 208c receives the divergent beam 250c and reflects a convergent beam 250d towards a tertiary mirror 208d (e.g., tertiary aspheric mirror 208d) which reflects a convergent beam 250e that forms an accessible exit pupil 254. From the exit pupil 254, the beam 250e converges and is incident on the imaging detector 212. The imaging detector 212 analyzes beam 250e and provides a narrow field of view image of the object. FIG. 2B for clarity did not show an incident beam 260a (optical beam 260a) which is associated with the wide field of view of the object (discussed next).

In FIG. 2C, the optical system 200 is shown configured to be in a WFOV mode during which the moveable field of view changing mirror 210 is located between the afocal three mirror anastigmat 206 and the focal three mirror anastigmat 208 so the wide field of view of the object is imaged onto the imaging detector 212. In this configuration, the optical system 200 is shown receiving an incident beam 260a (optical beam 260a) from the object (not shown) which passed through the second (small) entrance aperture 204. Beam 260a is incident on a tertiary mirror 206a (e.g., tertiary aspheric mirror 206a) which reflects a convergent beam 260b that forms an intermediate image 262 and then diverges and is incident on a fold mirror 206b. The fold mirror 206b reflects a divergent beam 260c that is incident on a secondary mirror 206c (e.g., secondary aspheric mirror 206c) which reflects a divergent beam 260d. Beam 260d is incident on a primary mirror 206d (e.g., primary aspheric mirror 206d) which reflects a collimated beam 260e towards the moveable field of view changing mirror 210. The moveable field of view changing mirror 210 reflects a beam 260f which is incident on the primary mirror 208a. The primary mirror 208a reflects beam 260f to form a convergent beam 260g. Beam 260g is incident on the secondary mirror 208b which reflects a convergent beam 260h that forms an intermediate image 264 and then beam 260h diverges and is incident on the fold mirror 208c.

The fold mirror 208c receives the divergent beam 260h and reflects a divergent beam 260i towards the tertiary mirror 208d which a reflects convergent beam 260j that forms an accessible exit pupil 266. From the exit pupil 266, the beam 260j converges and is incident on the imaging detector 212. The imaging detector 212 analyzes beam 260j and provides a wide field of view image of the object. FIG. 2C for clarity did not show the incident beam 250a (optical beam 250a) which is associated with the narrow field of view of the object.

The prescription data for an exemplary optical system 200 is provided below with respect to TABLES 7-12. TABLES 7-9 present surface prescription data for an exemplary afocal three mirror anastigmat 206 which has a 4× magnification, 12.5 mm entrance pupil diameter and a 8°×8° field of view. In TABLE 7, all dimensions are given in millimeters.

TABLE 7

| ELEMENT NUMBER | RADIUS OF CURVATURE | | THICKNESS | GLASS |
|---|---|---|---|---|
| | FRONT | BACK | | |
| OBJECT | INF | | INFINITY | |
| 1 | A(1) | | −84.6651 | REFL |
| | DECENTER(1) | | | |
| 2 | INF | | 24.2741 | REFL |
| 3 | A(2) | | −51.4141 | REFL |
| 4 | A(3) | | 100.0000 | REFL |
| | DECENTER(2) | | | |
| IMAGE | INF | | APERTURE STOP | |

In TABLE 7, element numbers 1-4 respectively correspond with the tertiary mirror 206a, the fold mirror 206b, the secondary mirror 206c and the primary mirror 206d. The "decenter" (D(j)) defines a new coordinate system (displaced and/or rotated) which is used to define surfaces of the optical system 200. The thickness indicates the axial distance to the next surface. The A(i) indicates the aspheric mirror i defined by the following equation and TABLE 8:

$$Z = \frac{(CURV)Y^2}{1 + \left(1 - (1+K)(CURV)^2 Y^2 \right)^{\frac{1}{2}}}$$

TABLE 8

| ASPHERIC | CURV | K |
|---|---|---|
| A(1) | −0.00925926 | −1.000000 |
| A(2) | 0.01941290 | −3.759012 |
| A(3) | 0.00725096 | −1.000000 |

In TABLE 9, the decenter system data are given where tilt configurations are defined by angles alpha, beta, and gamma (degrees) so as to follow standard cartesian coordinate system nomenclature. The trailing code BEND means tilting the coordinate system following the reflection by an amount equal to the tilt of the surface that is in question.

TABLE 9

| DECENTER | X | Y | Z | ALPHA | BETA | GAMMA |
|---|---|---|---|---|---|---|
| D(1) | 0.0000 | 0.0000 | 0.0000 | 45.0000 | 0.0000 | 0.0000 (BEND) |
| D(2) | 0.0000 | −53.0000 | 0.0000 | 0.0000 | 0.0000 | 0.0000 |

TABLES 10-12 present surface prescription data for an exemplary focal enhanced three mirror anastigmat 208 which has a 200 mm effective focal length (EFL), F/4 and a 2°×2° field of view. In TABLE 10, all dimensions are given in millimeters.

TABLE 10

| ELEMENT NUMBER | RADIUS OF CURVATURE | | THICKNESS | GLASS |
|---|---|---|---|---|
| | FRONT | BACK | | |
| OBJECT | INF | | INFINITY APERTURE STOP 125.0000 | |
| | DECENTER(1) | | | |
| 1 | A(1) | | −78.0000 | REFL |
| 2 | A(2) | | 59.7374 | REFL |
| | DECENTER(2) | | | |
| 3 | A(3) | | −122.8323 | REFL |
| 4 | A(4) | | 190.2668 | REFL |
| IMAGE | INF | | | |
| | DECENTER(3) | | | |

In TABLE 10, element numbers 1-4 respectively correspond with the primary mirror 208a, the secondary mirror 208b, the fold mirror 208c, and the tertiary mirror 208d. The "decenter" (D(j)) defines a new coordinate system (displaced and/or rotated) which is used to define surfaces of the optical system 200. The thickness indicates the axial distance to the next surface. The A(i) indicates the aspheric mirror i defined by the following equation:

$$Z = \frac{(CURV)Y^2}{1 + \left(1 - (1+K)(CURV)^2 Y^2\right)^{\frac{1}{2}}} + (A)Y^4 + (B)Y^6 + (C)Y^8 + (D)Y^{10}$$

where the base curvature (CURV) and aspheric constants K, A, B, C, and D are given in TABLE 11.

TABLE 11

| ASPHERIC | CURV | K | A | B | C | D |
|---|---|---|---|---|---|---|
| A(1) | −0.00421151 | −1.000000 | 0.00000E+00 | 0.00000E+00 | 0.00000E+00 | 0.00000E+00 |
| A(2) | −0.00295437 | −70.347787 | 0.00000E+00 | 0.00000E+00 | 0.00000E+00 | 0.00000E+00 |
| A(3) | 0.01382225 | 0.000000 | 8.64402E−06 | −2.98735E−07 | 9.57141E−10 | 1.38287E−11 |
| A(4) | 0.00651535 | −0.054238 | 0.00000E+00 | 0.00000E+00 | 0.00000E+00 | 0.00000E+00 |

In TABLE 12, the decenter system data are given where tilt configurations are defined by angles alpha, beta, and gamma (degrees) so as to follow standard cartesian coordinate system nomenclature. The trailing code BEND means tilting the coordinate system following the reflection by an amount equal to the tilt of the surface that is in question. The trailing code RETU means return to the coordinate system preceding the decentration.

TABLE 12

| DECENTER | X | Y | Z | ALPHA | BETA | GAMMA |
|---|---|---|---|---|---|---|
| D(1) | 0.0000 | −71.5202 | 0.0000 | 0.0000 | 0.0000 | 0.0000 |
| D(2) | 0.0000 | 0.0000 | 0.0000 | −49.8963 | 0.0000 | 0.0000 (BEND) |
| D(3) | 0.0000 | −0.2731 | 0.0000 | 19.3890 | 0.0000 | 0.0000 (RETU) |

Figure 3:
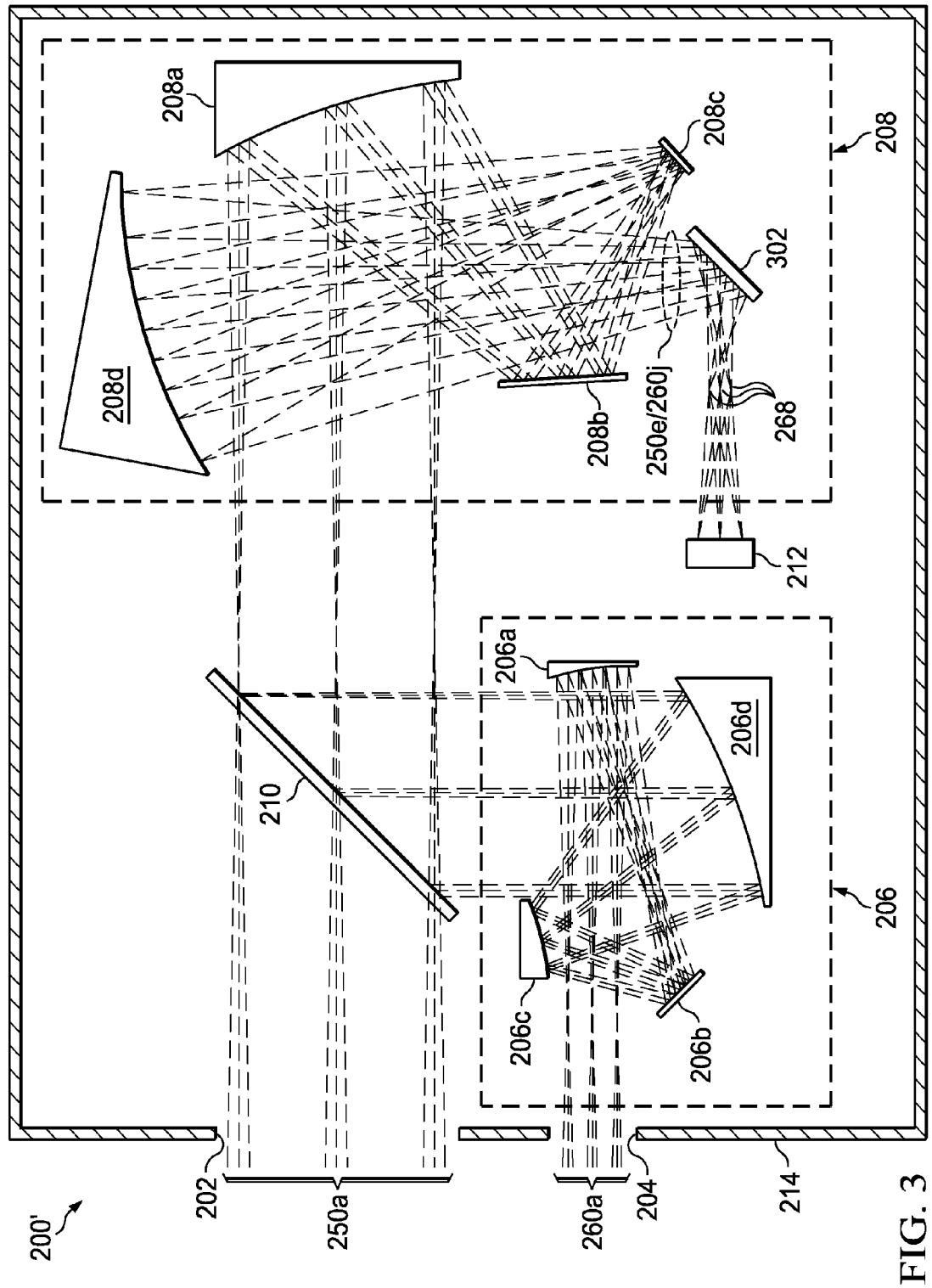
FIG. 3 is a diagram illustrating an optical system in accordance with a third embodiment of the present invention.

Referring to FIG. 3, there is a diagram illustrating an optical system 200' in accordance with a third embodiment of the present invention. Like optical system 200, the optical system 200' includes the first (large) entrance aperture 202, the second (small) entrance aperture 204, the reflective beam expander 206 (the tertiary mirror 206a, the fold mirror 206b, the secondary mirror 206c, and the primary mirror 206d), the reflective imager 208 (the primary mirror 208a, the secondary mirror 208b, the fold mirror 208c, and the tertiary mirror 208d), the moveable field of view changing mirror 210, and the imaging detector 212. The optical system 200' is packaged within the electro-optical gimbal assembly 214. However, the optical system 200' also incorporates an additional fold mirror 302 (within the reflective imager 208) that receives the optical beams 250e or 260j from the tertiary mirror 208d. The additional fold mirror 302 reflects the optical beams 250e or 260j which form an accessible exit pupil 268 and then the optical beams 250e or 260j converge before being received by the imaging detector 212.

Figure 4:
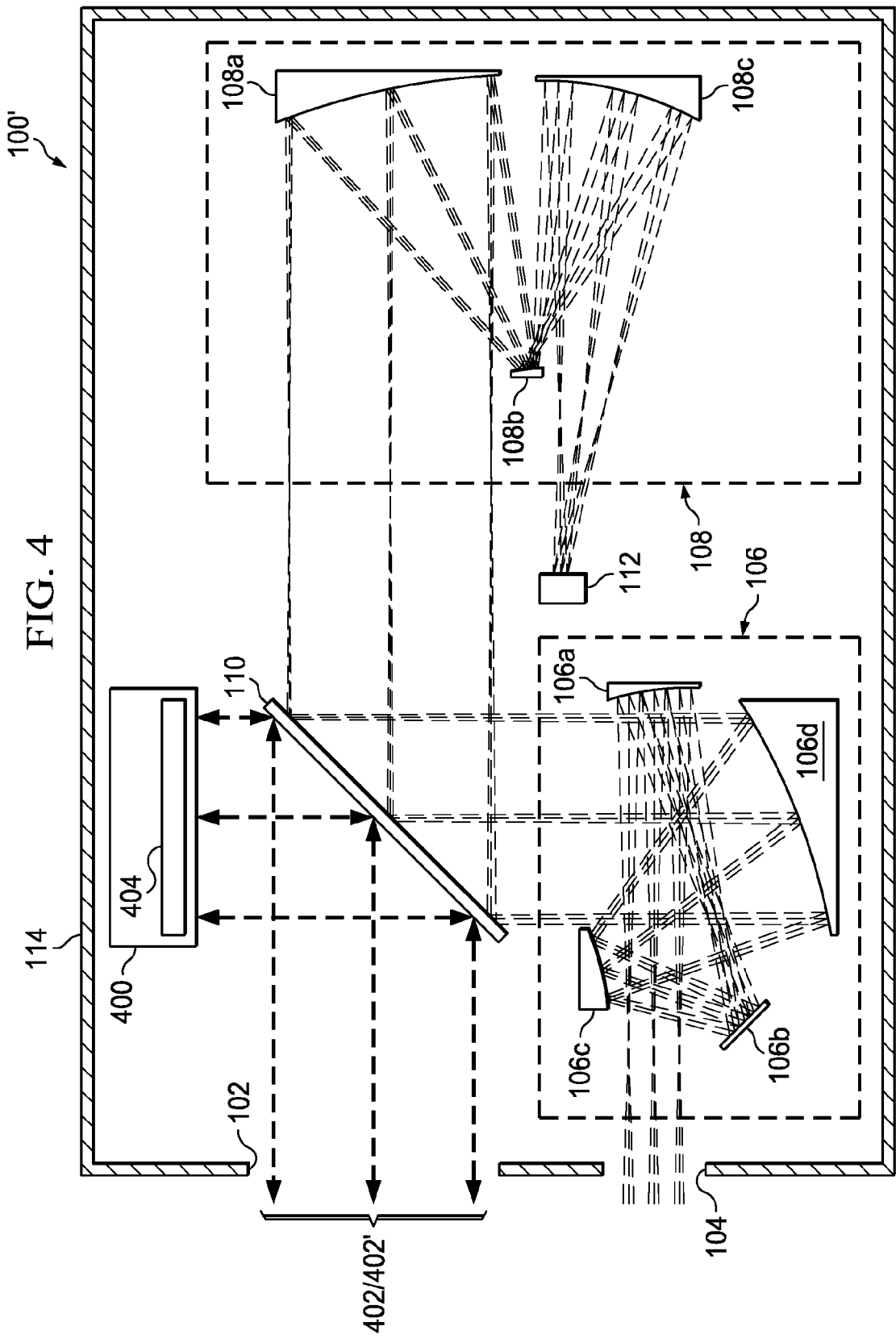
FIG. 4 is a diagram illustrating the optical system shown in FIG. 1 further incorporating a laser (rangefinder-designator) in accordance with another embodiment of the present invention.

Referring to FIG. 4, there is a diagram illustrating an optical system 100' that incorporates a laser 400 (rangefinder-designator 400) in accordance with another embodiment of the present invention. Like optical system 100, the optical system 100' includes the first (large) entrance aperture 102, the second (small) entrance aperture 104, the reflective beam expander 106 (the tertiary mirror 106a, the fold mirror 106b, the secondary mirror 106c, and the primary mirror 106d), the reflective imager 108 (the primary mirror 108a, the secondary mirror 108b, and the tertiary mirror 108c), the moveable field of view changing mirror 110, and the imaging detector 112. The optical system 100' is packaged within the electro-optical gimbal assembly 114. However, the optical system 100' also incorporates the laser 400 which emits a laser beam 402 that is reflected by the moveable field of view changing fold mirror 110 and passes through the first entrance aperture 102 towards the object (e.g., target). Then, a portion of the laser beam 402 directed to the object (e.g., target) would be reflected by the object (e.g., target) and subsequently received at the first entrance aperture 102 and directed to and reflected off the moveable field of view changing fold mirror 110 towards a detector 404 within the laser 400. Thus, the laser beam 402' reflected from the object (e.g., target) would effectively follow a reverse path to that of the emitted laser beam 402. In one application, the laser 400 can be used to range the object (e.g., target) by measuring the time required for the laser beam 402 and 402' to travel a roundtrip from the laser 400 to the object (e.g., target) and back to the laser 400. In another application, the laser beam 402 emitted from the reflective telescope 100' can be used to designate-highlight the object (e.g., target) so an asset (e.g., laser guided weaponry) is able to recognize the highlighted object (e.g., target). As can be seen, the laser 400 can be used only when the optical system 100' is operating in the wide field of mode during which the moveable field of view changing mirror 110 is flipped into place between the reflective beam expander 106 and the reflective imager 108. If desired, the laser 400 can be utilized and positioned in the same place for the optical systems 200 and 200' described above with respect to FIGS. 2A-2C and 3.

Figure 5A:
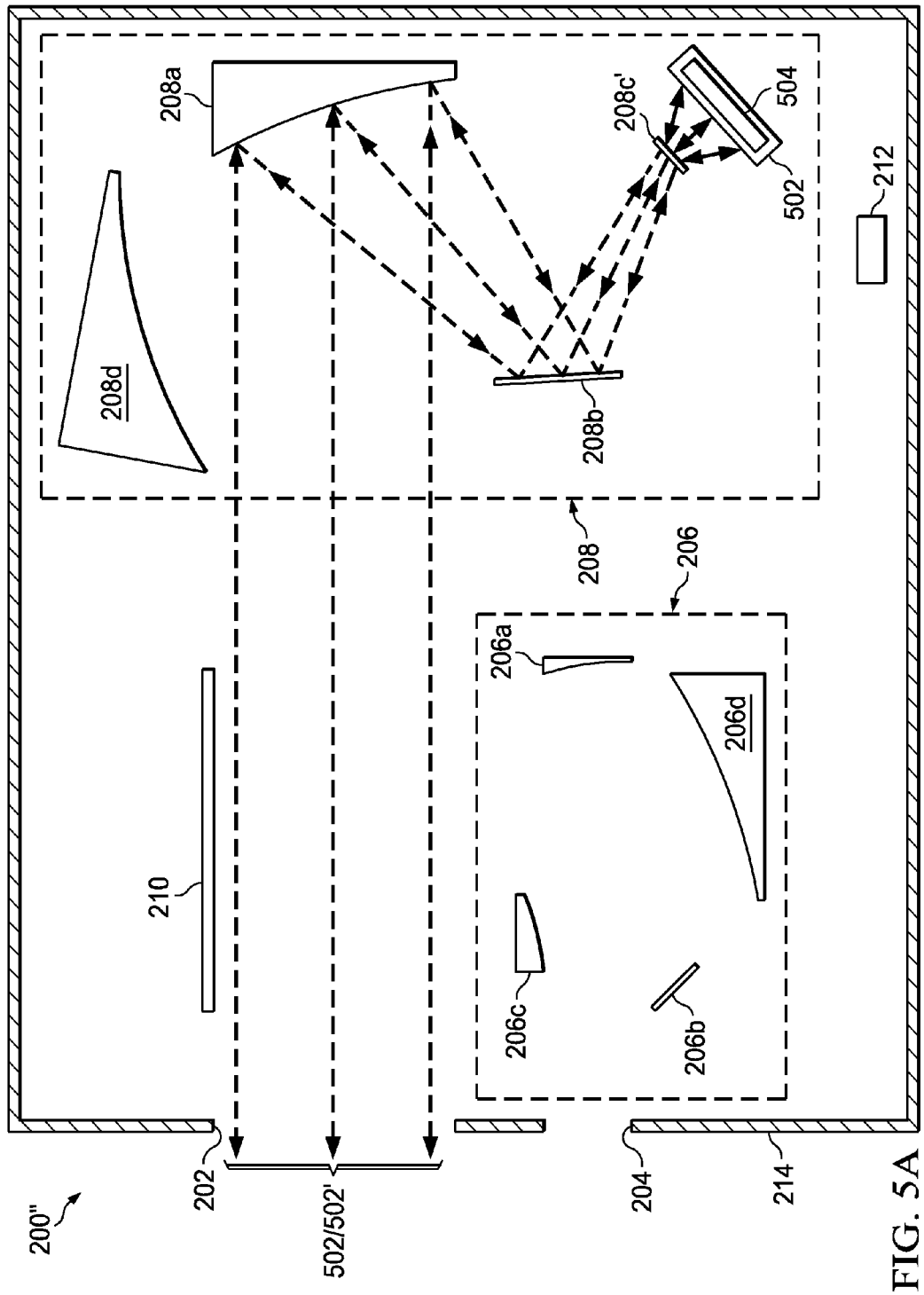
FIGS. 5A and 5B are diagrams illustrating the optical system shown in FIGS. 2A-2C further incorporating a laser (rangefinder-designator) in accordance with yet another embodiment of the present invention.
Figure 5B:
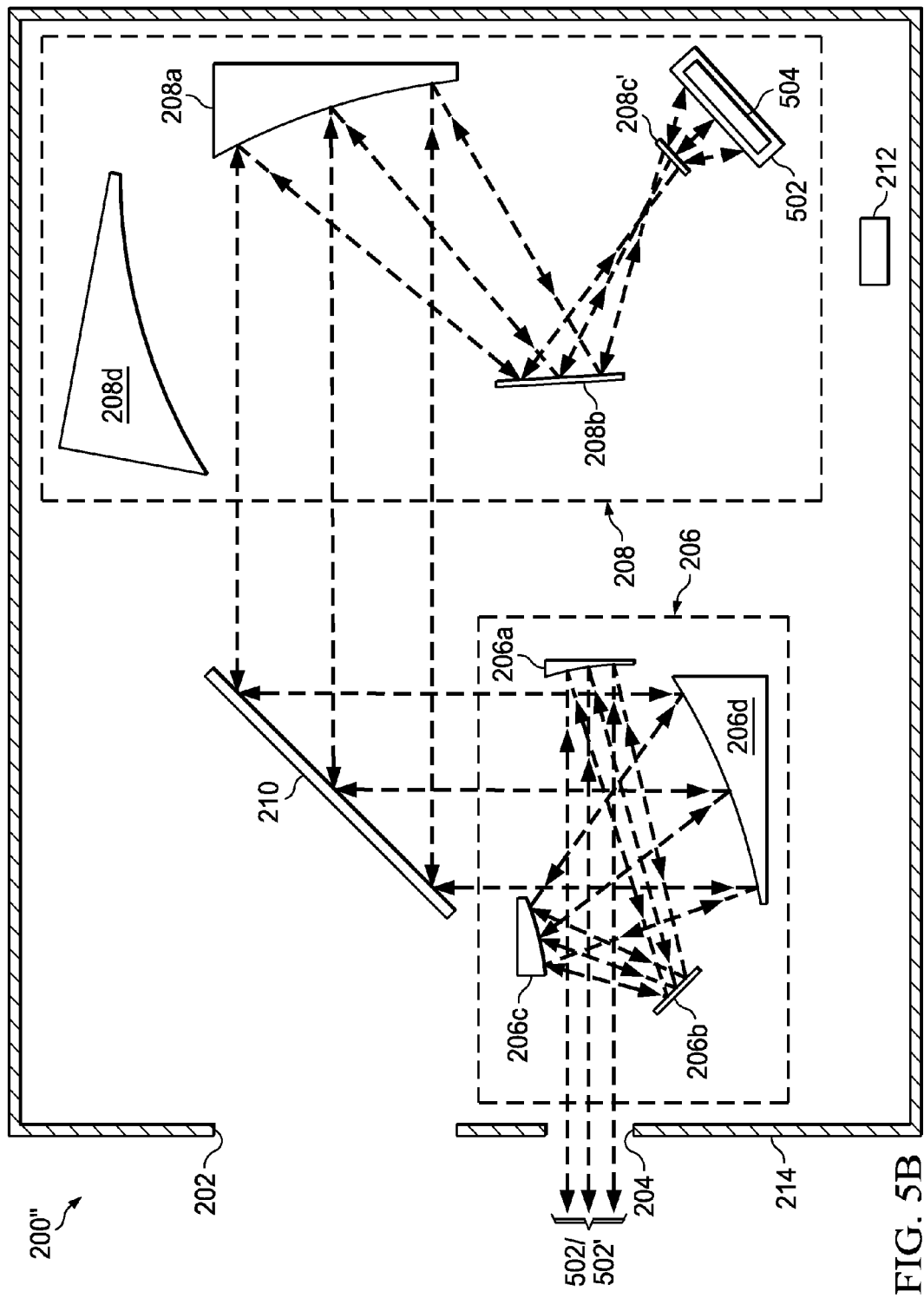

Referring to FIGS. 5A and 5B, there are diagrams illustrating an optical system 200" that incorporates a laser 500 (rangefinder-designator 500) in accordance with yet another embodiment of the present invention. Like optical system 200, the optical system 200" includes the first (large) entrance aperture 202, the second (small) entrance aperture 204, the reflective beam expander 206 (the tertiary mirror 206a, the fold mirror 206b, the secondary mirror 206c, and the primary mirror 206d), the reflective imager 208 (the primary mirror 208a, the secondary mirror 208b, a notch beamsplitter 208c' (used instead of the fold mirror 208c), and the tertiary mirror 208d), the moveable field of view changing mirror 210, and the imaging detector 212. The optical system 200" is packaged within the electro-optical gimbal assembly 214. However, the optical system 200" also incorporates the laser 500 and uses the notch beamsplitter 208c' instead of the fold mirror 208. The notch beamsplitter 208c' functions the same as the fold mirror 208 with respect to reflecting optical beams 250d and 260i (see FIGS. 2B and 2C) but also allows the laser 500 to emit and receive laser beams 502 and 502' there through as discussed next. FIGS. 5A and 5B for clarity do not show optical beams 250a, 250b . . . 250e and optical beams 260a, 260b . . . 260j.

In FIG. 5A, the optical system 200" is shown configured to be in the NFOV mode during which the moveable field of view changing mirror 210 is located out of the beam path so the narrow field of view of the object is imaged onto the imaging detector 212 (see previous discussion associated with optical system 200). In addition, the laser 500 emits a laser beam 502 that passes through the notch beamsplitter 208c' and is reflected by the secondary mirror 208b and then the primary mirror 208a before passing through the first entrance aperture 202 towards the object (e.g., target). Then, a portion of the laser beam 502 directed to the object (e.g., target) would be reflected by the object (e.g., target) and subsequently received at the first entrance aperture 202 and reflected by the primary mirror 208a and the secondary mirror 208b before passing through the notch beamsplitter 208c' and being received by a detector 504 within the laser 500. Thus, the laser beam 502' reflected from the object (e.g., target) would effectively follow a reverse path to that of the emitted laser beam 502. In one application, the laser 500 can be used to range the object (e.g., target) by measuring a time required for the laser beam 502 and 502' to travel a roundtrip from the laser 500 to the object (e.g., target) and back to the laser 500. In another application, the laser beam 502 emitted from the reflective telescope 200" can be used to designate-highlight the object (e.g., target) so an asset (e.g., laser guided weaponry) is able to recognize the highlighted object (e.g., target). If desired, the laser 500 and the notch beamsplitter 208c' can be utilized and positioned in the same place within the optical system 200' described above with respect to FIG. 3.

In FIG. 5B, the optical system 200" is shown configured to be in the WFOV mode during which the moveable field of view changing mirror 210 is located between the afocal three mirror anastigmat 206 and the focal three mirror anastigmat 208 so the wide field of view of the object is imaged onto the imaging detector 212 (see previous discussion associated with optical system 200). In addition, the laser 500 emits a laser beam 502 that passes through the notch beamsplitter 208c' and is reflected by the secondary mirror 208b, the primary mirror 208a, the moveable field of view changing mirror 210, the primary mirror 206d, the secondary mirror 206c, the fold mirror 206b, and then the tertiary mirror 206a before passing through the second entrance aperture 204 towards the object (e.g., target). Then, a portion of the laser beam 502 directed to the object (e.g., target) would be reflected by the object (e.g., target) and subsequently received back at the second entrance aperture 202 and directed to the tertiary mirror 206a, the fold mirror 206b, the secondary mirror 206c, the primary mirror 206d, the moveable field of view changing mirror 210, the primary mirror 208a, the secondary mirror 208b before passing through the notch beamsplitter 208c' and being received by the detector 504 within the laser 500. Thus, the laser beam 502' reflected from the object (e.g., target) would effectively follow a reverse path to that of the emitted laser beam 502. In one application, the laser 500 can be used to range the object (e.g., target) by measuring a time required for the laser beam 502 and 502' to travel a roundtrip from the laser 500 to the object (e.g., target) and back to the laser 500. In another application, the laser beam 502 emitted from the reflective telescope 200" can be used to designate-highlight the object (e.g., target) so an asset (e.g., laser guided weaponry) is able to recognize the highlighted object (e.g., target).

Figure 6:
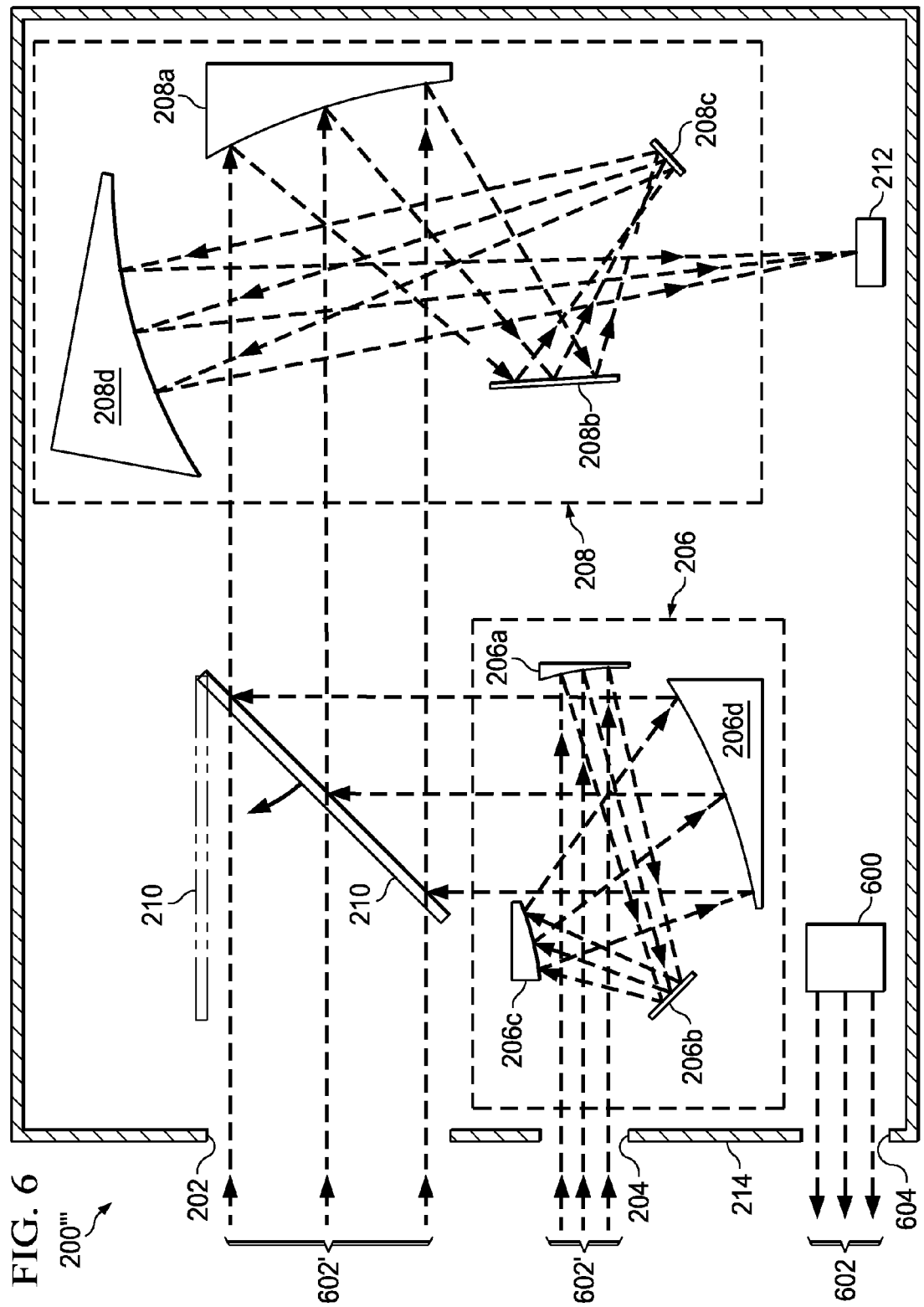
FIG. 6 is diagram illustrating the optical system shown in FIGS. 2A-2C further incorporating a laser (rangefinder-designator) in accordance with still yet another embodiment of the present invention.

Referring to FIG. 6, there is a diagram illustrating an optical system 200''' that incorporates a laser 600 (rangefinder-designator 600) in accordance with still yet another embodiment of the present invention. Like optical system 200, the optical system 200''' includes the first (large) entrance aperture 202, the second (small) entrance aperture 204, the reflective beam expander 206 (the tertiary mirror 206a, the fold mirror 206b, the secondary mirror 206c, and the primary mirror 206d), the reflective imager 208 (the primary mirror 208a, the secondary mirror 208b, the fold mirror 208c, and the tertiary mirror 208d), the moveable field of view changing mirror 210, and the imaging detector 212. The optical system 200''' is packaged within the electro-optical gimbal assembly 214. However, the optical system 200''' also incorporates the laser 600 which emits a laser beam 602 through an output opening 604 towards the object (e.g., target). Then, a portion of the laser beam 602 directed to the object (e.g., target) would be reflected by the object (e.g., target) and subsequently received at the first and second entrance apertures 202 and 204 before being received by the imaging detector 212.

In particular, if the optical system 200''' is in the NFOV mode then the laser beam 602' that is reflected from the object (e.g., target) and received through the first entrance aperture 202 is reflected by the primary mirror 208a, the secondary mirror 208b, the fold mirror 208c, and the tertiary mirror 208d before being received by the imaging detector 212. If the optical system 200''' is in the WFOV mode then the laser beam 602' that is reflected from the object (e.g., target) and received through the second entrance aperture 204 and reflected by the tertiary mirror 206a, the fold mirror 206b, the secondary mirror 206c, the primary mirror 206d, the moveable field of view changing mirror 210, the primary mirror 208a, the secondary mirror 208b, the fold mirror 208c, and the tertiary mirror 208d before being received by the imaging detector 212. In one application, the laser 600 can be used to range the object (e.g., target) by measuring a time required for the laser beam 602 and 602' to travel a roundtrip from the laser 600 to the object (e.g., target) and back to the imaging detector 212. In another application, the laser beam 602 emitted from the reflective telescope 200′″ can be used to designate-highlight the object (e.g., target) so an asset (e.g., laser guided weaponry) is able to recognize the highlighted object (e.g., target).

From the foregoing, it can be readily appreciated that the present invention relates to a compact, all reflective optical system 100, 200, and 200′ that has multiple fields of view for imaging that have identical viewing directions and can incorporate several different configurations of laser range finding and designating components. As described above, the present invention combines a reflective beam expander 106 and 206 (including a folded afocal TMA (three mirror anastigmat)) with a reflective imager 108 and 208 (including a folded or unfolded focal TMA) to provide the broadband multiple field of view optical system 100, 200 and 200′. The optical system 100, 200 and 200′ is all reflective so that it can image over any wavelength band with no chromatic aberrations. The folded architecture of the optical system 100, 200 and 200′ lends itself to applications where "compact" and "lightweight" are desirable features or requirements.

In the main configuration, the afocal TMA 106 and 206 is a three mirror system (primary, secondary, and tertiary) that is utilized as a reflective beam expander for the wide field operation mode. The ratio of the field of view between the narrow field of view and the wide field of view imaging modes is dependent on the afocal magnification of the afocal TMA 106 and 206. The addition of a fold mirror 106b and 206b to the afocal TMA 106 and 206 allows the optical system 100, 200 and 200′ to be folded into an even more compact configuration such that both fields of view "look" in the same direction. To increase the magnification and/or improve imaging performance the additional fold mirror 106b and 206b can be allowed to have power and/or be aspherized.

In the main configuration, the focal TMA 108 and 208 is also a three mirror system (primary, secondary, and tertiary) and has an accessible external pupil 154, 166, 254 and 266 for 100% cold stop efficiency. The addition of one or more fold mirrors 208c and 208e to the focal TMA 208 allows the optical system 200 and 200′ to be folded into a more compact configuration with better access to the cold stop and the image plane. To increase the field of view and/or improve imaging performance the fold mirror 208c and 208e can be allowed to have power and/or be aspherized. The moveable fold switching mirror 110 and 210 between the two TMAs 106, 108, 206 and 208 allows the selection between the NFOV mode operation and the WFOV mode operation. The moveable fold switching mirror 110 and 210 can be moved by anyone of a variety of mechanisms including, for example, a piezoelectric mechanism.

An added feature of allowing a rangefinder 400 or other similar device to look out of the narrow field of view window 102 by utilizing the back side of the moveable field of view changing fold mirror 110 is included (see FIG. 4). Furthermore, to maximize the common aperture for laser rangefinder/designator operation, the fold mirror 208c in the focal TMA 208 can be replaced with a notch spectral beamsplitter 208c' that transmits the laser wavelength and reflects all other operational wavelengths (see FIGS. 5A-5B). Alternatively, a separate transmit aperture 604 for a laser 600 can be employed to receive the laser rangefinder and/or designator simultaneously with all operational imaging functions (see FIG. 6).

Other options for the reflective beam expander 106 and 206 include a Mersenne type design including two confocal parabolas for smaller magnification range and a folded afocal Schwartzchild (two mirror Schwartzchild with a parabolic collimator and a fold mirror configuration similar to proposed afocal TMA) for increased magnification. It should be noted that the afocal TMAs 106 and 206 are used in a different direction in the present invention when compared to the typical applications where they function as a beam reducer which feeds multiple imaging paths with different waveband detectors.

Other options for the reflective imager 108 and 208 include the standard two mirror systems such as the Cassegrain, Gregorian, Schmidt, etc. for a narrower field of view operation or if an accessible pupil plane is not required for 100% cold stop efficiency a reflective triplet (RT) with no intermediate image can be used to obtain wider fields of view.

Following are some exemplary advantages and exemplary features associated with the present invention:
No refractive components in imaging paths (allows a larger bandwidth without the need for color correction).
Compact folded architecture.
Lightweight.
External pupil for 100% cold shield efficiency.
Multiple field of view operation.
Long focal length in small package configuration.
Ability to view operational scene and laser rangefinder/designator simultaneously on same detector.
Versatility in incorporating laser rangefinder/designator capability.
Reduced boresight error between fields of view due to minimal moving components.
All fields of view (and laser) have identical viewing directions.
All-reflective design allows operation in all weather and day/night conditions simultaneously.
Elimination of refractive components and normal incidence components minimizes optical cross-section and improves laser countermeasures performance.
Simple reflection coatings replace complicated, multilayer dielectric coatings required on refractive components.
High transmission.

Although multiple embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the spirit of the invention as set forth and defined by the following claims.

The invention claimed is:

1. An optical system adapted to operate in either a narrow field of view mode or a wide field of view mode of an object, the optical system comprising:
a first entrance aperture;
a second entrance aperture;
moveable field of view changing fold mirror;
a reflective beam expander;
a reflective imager; and
an imaging detector;
wherein in the narrow field of view mode:
the moveable field of view changing fold mirror is located out of an optical beam path;
the reflective imager includes:
a primary mirror positioned to receive and reflect a first optical beam that passed through the first entrance aperture;
a secondary mirror positioned to receive and reflect the first optical beam reflected from the primary mirror; and a tertiary mirror positioned to receive and reflect the first optical beam reflected from the secondary mirror;

the imaging detector is positioned to receive the first optical beam reflected from the tertiary mirror and to image the object;

wherein in the wide field of view mode:
the reflective beam expander includes:
a tertiary mirror positioned to receive and reflect a second optical beam that passed through the second entrance aperture;
a stationary fold mirror positioned to receive and reflect the second optical beam reflected from the tertiary mirror;
a secondary mirror positioned to receive and reflect the second optical beam reflected from the stationary fold mirror; and
a primary mirror positioned to receive and reflect the second optical beam reflected from the secondary mirror;
the moveable field of view changing fold mirror is located in the optical beam path and positioned to be a first component to receive the second optical beam reflected from the primary mirror in the reflective beam expander and to reflect the second optical beam to the reflective imager;
the reflective imager includes:
the primary mirror is positioned to receive and reflect the second optical beam reflected from the moveable field of view changing fold mirror;
the secondary mirror is positioned to receive and reflect the second optical beam reflected from the primary mirror; and
the tertiary mirror is positioned to receive and reflect the second optical beam reflected from the secondary mirror; and
the imaging detector is positioned to receive the second optical beam reflected from the tertiary mirror in the reflective imager and to image the object.

2. The optical system of claim 1, wherein the reflective imager has an exit pupil that is accessible to enable an 100% cold shield efficiency for the imaging device.

3. An optical system adapted to operate in either a narrow field of view mode or a wide field of view mode of an object, the optical system comprising:
a first entrance aperture;
a second entrance aperture;
moveable field of view changing fold mirror;
a reflective beam expander;
a reflective imager; and
an imaging detector;
wherein in the narrow field of view mode:
the moveable field of view changing fold mirror is located out of an optical beam path;
the reflective imager includes:
a primary mirror positioned to receive and reflect a first optical beam that passed through the first entrance aperture;
a secondary mirror positioned to receive and reflect the first optical beam reflected from the primary mirror;
a first stationary fold mirror or a notch spectral beamsplitter positioned to receive and reflect the first optical beam reflected from the secondary mirror; and
a tertiary mirror positioned to receive and reflect the first optical beam reflected from the first stationary fold mirror or the notch spectral beamsplitter;
the imaging detector is positioned to receive the first optical beam reflected from the tertiary mirror and to image the object;

wherein in the wide field of view mode:
the reflective beam expander includes:
a tertiary mirror positioned to receive and reflect a second optical beam that passed through the second entrance aperture;
a stationary fold mirror positioned to receive and reflect the second optical beam reflected from the tertiary mirror;
a secondary mirror positioned to receive and reflect the second optical beam reflected from the stationary fold mirror; and
a primary mirror positioned to receive and reflect the second optical beam reflected from the secondary mirror;
the moveable field of view changing fold mirror is located in the optical beam path and positioned to be a first component to receive the second optical beam reflected from the primary mirror in the reflective beam expander and to reflect the second optical beam to the reflective imager;
the reflective imager includes:
the primary mirror is positioned to receive and reflect the second optical beam reflected from the moveable field of view changing fold mirror;
the secondary mirror is positioned to receive and reflect the second optical beam reflected from the primary mirror;
the first stationary fold mirror or the notch spectral beamsplitter is positioned to receive and reflect the second optical beam reflected from the secondary mirror; and
the tertiary mirror is positioned to receive and reflect the second optical beam reflected from the first stationary fold mirror or the notch spectral beamsplitter;
the imaging detector is positioned to receive the second optical beam reflected from the tertiary mirror in the reflective imager and to image the object.

4. The optical system of claim 3, wherein:
the reflective imager further includes a secondary stationary fold mirror that receives and reflects the first optical beam or the second optical beam reflected from the tertiary mirror; and
the imaging device receives the first optical beam or the second optical beam from the secondary stationary fold mirror instead from the tertiary mirror in the reflective imager.

5. The optical system of claim 3, wherein the reflective imager has an exit pupil that is accessible to enable an 100% cold shield efficiency for the imaging device.

* * * * *